(12) United States Patent
Yata

(10) Patent No.: US 7,962,029 B2
(45) Date of Patent: Jun. 14, 2011

(54) AUTO FOCUS SYSTEM HAVING AF FRAME AUTO-TRACKING FUNCTION

(75) Inventor: Kunio Yata, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 76 days.

(21) Appl. No.: 12/557,328

(22) Filed: Sep. 10, 2009

(65) Prior Publication Data

US 2010/0098397 A1 Apr. 22, 2010

(30) Foreign Application Priority Data

Oct. 16, 2008 (JP) ................. P2008-267293

(51) Int. Cl.
*G03B 13/36* (2006.01)

(52) U.S. Cl. ............. 396/95; 396/124; 396/147

(58) Field of Classification Search ........... 396/95, 396/121–124, 147
See application file for complete search history.

(56) References Cited

U.S. PATENT DOCUMENTS

| 7,561,790 B2 * | 7/2009 | Yata ........................ 396/124 |
| 7,660,519 B2 * | 2/2010 | Iwane et al. ............ 396/123 |
| 2006/0210260 A1 | 9/2006 | Yata |
| 2008/0180542 A1 | 7/2008 | Kuniyuki et al. |
| 2009/0238550 A1 * | 9/2009 | Kanayama ............... 396/95 |

FOREIGN PATENT DOCUMENTS

| EP | 1909229 A2 | 4/2008 |
| EP | 1968310 A2 | 9/2008 |
| JP | 2006-258944 A | 9/2006 |

* cited by examiner

*Primary Examiner* — W. B. Perkey
(74) *Attorney, Agent, or Firm* — Birch, Stewart, Kolasch & Birch, LLP

(57) ABSTRACT

Disclosed is an auto focus system having an auto focus (AF) frame auto-tracking function that detects the image of an object to be tracked as an AF target using a pattern matching process and moves an AF frame indicating an AF target range to the position of the object, thereby tracking the object. When a person's face (face image) is included in the AF frame, the auto focus system having an AF frame auto-tracking function automatically sets the AF frame in an appropriate range so as to correspond to the position and size of the face image. Therefore, even when the size of the face image is changed, it is possible to appropriately track the face and perform focusing on the face.

3 Claims, 5 Drawing Sheets

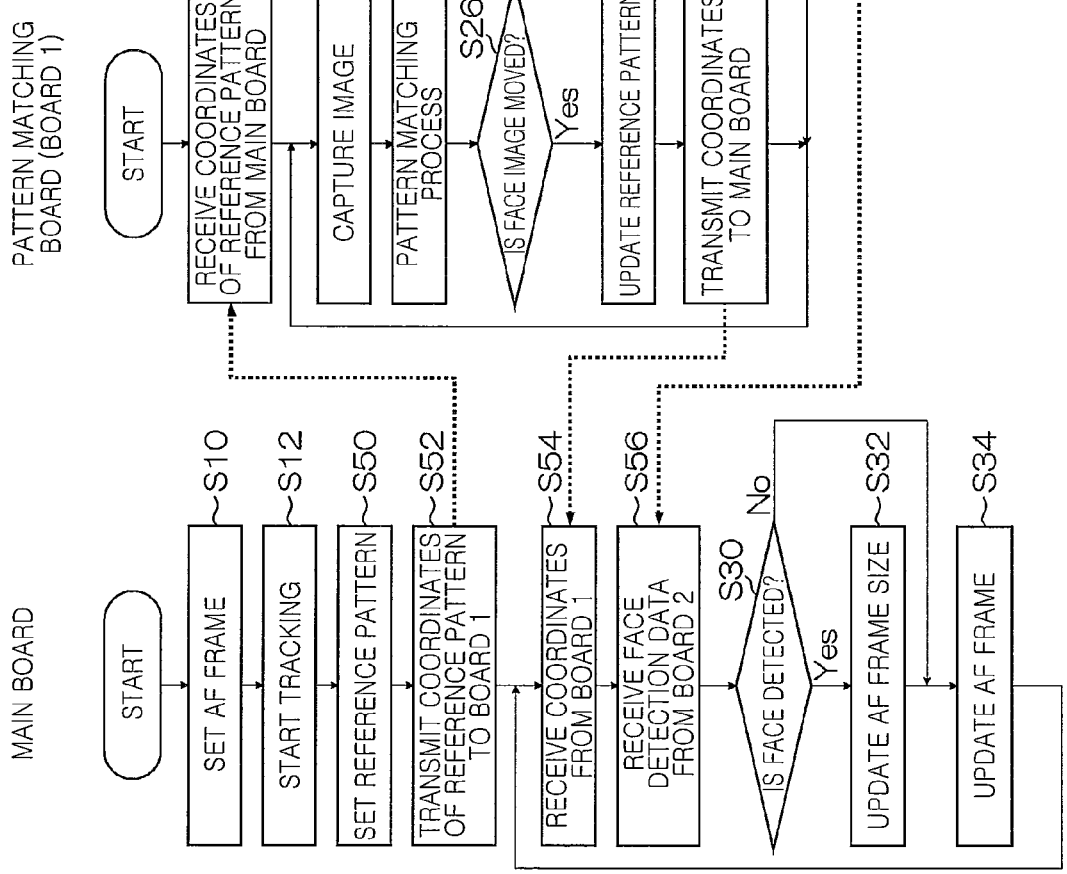

US 7,962,029 B2

AUTO FOCUS SYSTEM HAVING AF FRAME AUTO-TRACKING FUNCTION

CROSS-REFERENCE TO RELATED APPLICATIONS

This application is based upon and claims the benefit of priority from the Japanese Patent Application No. 2008-267293 filed on Oct. 16, 2008; the entire contents of which are incorporated herein by reference.

BACKGROUND OF THE INVENTION

1. Field of the Invention

The present invention relates to an auto focus system having an AF frame auto-tracking function, and more particularly, to an auto focus system having an AF frame auto-tracking function that allows an AF area (AF frame), which is the target range of an object brought into focus by auto focus (AF), to follow a predetermined object moved on an imaging screen.

2. Description of the Related Art

Broadcasting or commercial television camera systems having an auto focus function for auto focusing on a desired object have been known. This type of camera system generally uses contrast-type AF. In the contrast-type AF, the camera system detects the level of the contrast of the captured image, and controls the focus of an imaging optical system such that the contrast becomes the maximum (the largest).

In general, the target range of an object that is brought into focus by AF is not the entire screen of the captured image, but is limited to a portion of the screen, which is called an AF area. Focus control is performed such that the contrast of the captured image (object image) in the AF area becomes the maximum, thereby focusing on the object in the AF area.

In the specification, a frame indicating the outline of the AF area is referred to as an AF frame.

JP-A-2006-258944 (corresponding to US 2006/210260 A) discloses an auto focus system having an AF frame auto-tracking function that allows the AF frame to automatically follow a desired object moved on the screen of the captured image such that the object is continuously in focus. The auto-tracking of the AF frame is performed by detecting the image of an object to be tracked from the captured image and moving the AF frame to the detected position. As a method of detecting the image of an object to be tracked, JP-A-2006-258944 discloses a method of storing the image of the object to be tracked as a reference pattern and detecting an image matched with the reference pattern from the captured image using a pattern matching process.

However, in some cases, the user wants to use the AF frame auto-tracking function to track, for example, a person's face. In this case, when the size of the AF frame is excessively larger than that of the face (face image) in the captured image, a large portion of the background image is included in the AF frame. When a large number of high frequency components are included in the background image, the imaging device focuses on the background in the contrast-type AF. In addition, the image of a reference pattern is set to an initial image in the AF frame or an image in a range corresponding to the AF frame in the pattern matching process. Therefore, when the background image of the face image varies, it is difficult to detect an image matched with the image of the reference pattern in the pattern matching process. Therefore, it is difficult to move the AF frame to track the face image.

Even though the AF frame auto-tracking function starts to set the AF frame to an appropriate size corresponding to the size of the face image to be tracked, the size of the face image in the AF frame is changed when a zoom operation of an imaging lens (imaging optical system) is performed or when the distance between a camera and an object varies. Therefore, for example, when the zoom operation is performed to a wide side, the size of the face image in the captured image is reduced, which causes the above-mentioned problems. When the zoom operation is performed to a telephoto side, a portion of the face image is within the range of the AF frame, and high frequency components are reduced. As a result, it is difficult to perform focusing on the object by AF. In addition, in the pattern matching process, it is difficult to detect an image matched with the image of the reference pattern. Therefore, it is difficult to move the AF frame to track the face image.

Further, it takes time and effort for the user to set and change the AF frame according to the size of the face image to be tracked. It is difficult for the user to set and change the AF frame.

SUMMARY OF THE INVENTION

The invention has been made in order to solve the above-mentioned problems, and an object of the invention is to provide an auto focus system having an AF frame auto-tracking function that can automatically set an AF frame in an appropriate range so as to correspond to the position and size of a face image when a person's image (face image) is tracked as an AF target.

According to a first aspect of the invention, an auto focus system having an AF frame auto-tracking function includes: an auto focus unit that controls the focus of an imaging optical system which focuses an imaging unit on an object such that an object in a portion corresponding to an AF frame in the range of the object captured by the imaging unit is in focus; a reference pattern image storage unit that stores the image of an object, which is a tracking target to be focused, as a reference pattern image; a pattern matching unit that detects the image of the object, which is the tracking target, from the image captured by the imaging unit, using a pattern matching process, on the basis of the reference pattern image; an AF frame changing unit that changes the position of the AF frame on the basis of the position of the image of the object, which is the tracking target, sequentially detected by the pattern matching unit from the image sequentially captured by the imaging unit such that the auto focus unit performs auto focus on the object, which is the tracking target; and a face detecting unit that detects the image of a person's face from the image captured by the imaging unit. When the image of the face detected by the face detecting unit is included in the range of the AF frame, the AF frame changing unit changes the range of the AF frame so as to correspond to the position and size of the image of the face.

According to a second aspect of the invention, in the auto focus system having an AF frame auto-tracking function according to the first aspect, the AF frame changing unit may change the position and size of the AF frame so as to correspond to the position and size of the image of the face.

According to a third aspect of the invention, in the auto focus system having an AF frame auto-tracking function according to the first or second aspect, the reference pattern image stored in the reference pattern image storage unit may be sequentially updated with an image in a range corresponding to the AF frame.

According to the above-mentioned aspects of the invention, when the face image is included in the AF frame, the range of the AF frame is automatically changed so as to correspond to the position and size of the face image. Therefore, the user does not need to accurately set the AF frame according to the size of the face image in the captured image. Even when the size of the face image is changed by, for example, a zoom operation, the size of the AF frame is automatically changed to an appropriate size.

According to the above-mentioned aspects of the invention, when a person's image (face image) is tracked as an AF target, the AF frame is automatically set in an appropriate range suitable for the position and size of the face image. Therefore, it is possible to appropriately track the face image and appropriately perform focusing on the face by AF.

BRIEF DESCRIPTION OF THE DRAWINGS

FIGS. 4A to 4C are flowcharts illustrating the procedure of a second embodiment of the AF frame setting process.

DESCRIPTION OF THE PREFERRED EMBODIMENTS

Hereinafter, an auto focus system having an AF frame auto-tracking function according to an embodiment of the invention will be described in detail with reference to the accompanying drawings.

Figure 1:
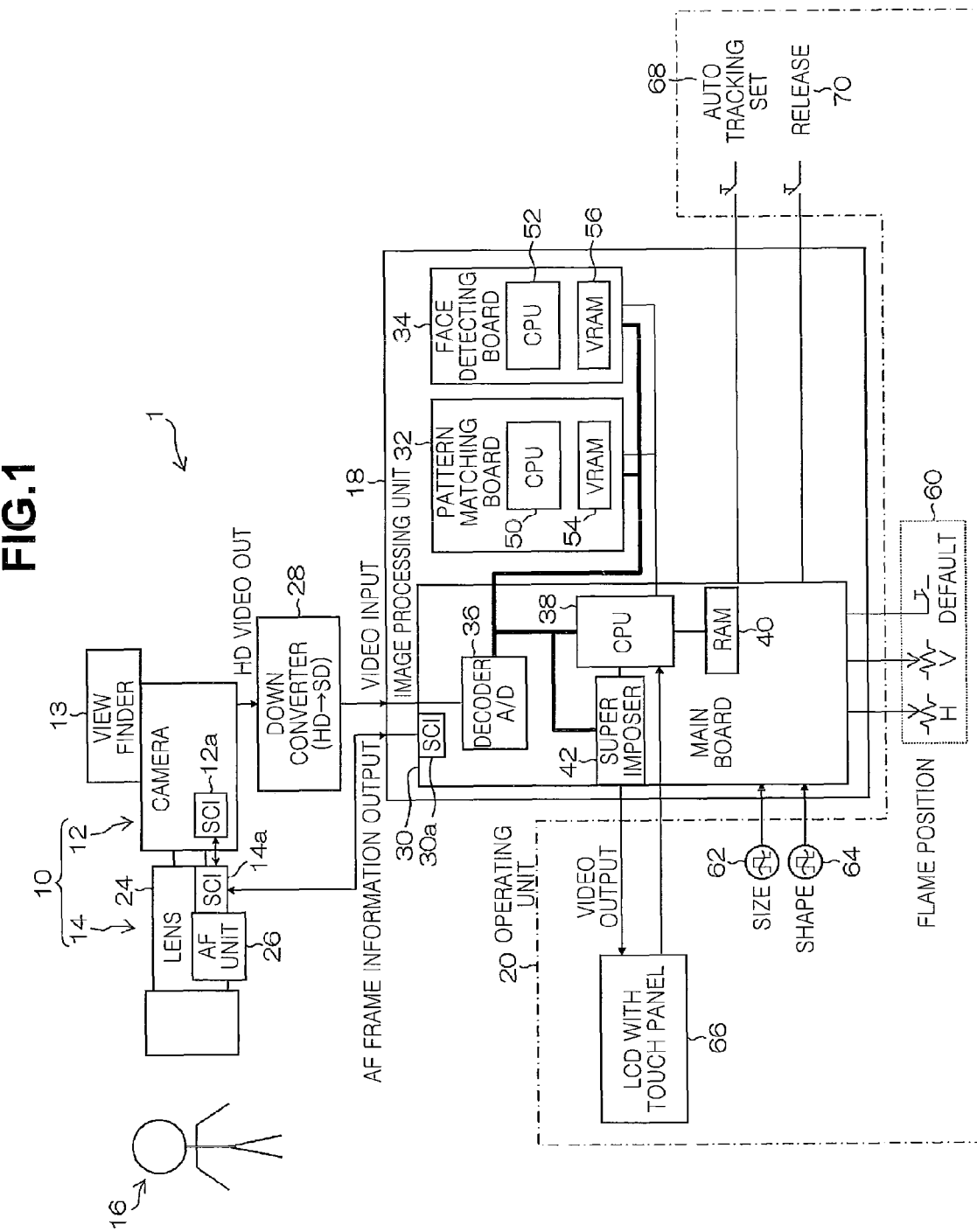
FIG. 1 is a block diagram illustrating the overall structure of a video camera system according to an embodiment of the invention.

FIG. 1 is a block diagram illustrating the overall structure of a video camera system according to the invention. The video camera system is an imaging system that is used to capture images with, for example, a broadcasting television camera.

As shown in FIG. 1, a video camera system 1 according to this embodiment includes a television camera 10 and an image processing unit 18.

The television camera 10 includes a camera body 12, which is an HD camera corresponding to a high-definition television [HD TV] system, and a lens device 14 including an imaging lens (optical system) mounted to a lens mount of the camera body 12.

For example, the camera body 12 is provided with an imaging device (for example, a CCD) and a predetermined signal processing circuit. The image formed by the imaging lens of the lens device 14 is converted into electric signals by the imaging device, and the signal processing circuit performs predetermined signal processing on the electric signals to generate HDTV video signals (HDTV signals). The generated HDTV video signals are output from a video signal output terminal of the camera body 12 to the outside.

The camera body 12 also includes a viewfinder 13, and an image that is being currently captured by the television camera 10 is displayed on the viewfinder 13. In addition, various information items are displayed on the viewfinder 13. For example, an AF frame, which is a focus target range during auto focus (which will be described below), is displayed so as to overlap a captured image.

The lens device 14 includes an imaging lens (zoom lens) 24 mounted to the lens mount of the camera body 12. The imaging lens 24 focuses an object 16 on the imaging surface of the imaging device of the camera body 12. Although not shown in the drawings, the imaging lens 24 includes, as components, movable portions for adjusting imaging conditions, such as a focus lens group, a zoom lens group, and an aperture diaphragm. These movable portions are electrically driven by a motor (servo mechanism). For example, the focus lens group is moved in the optical axis direction to adjust the focus (object distance), and the zoom lens group is moved in the optical axis direction to adjust the focal length (zoom ratio).

In the auto focus (AF) system, at least the focus lens group may be electrically driven, and the other movable portions may be manually driven. When a predetermined movable portion is electrically driven in response to instructions from the operator, the operation of the movable portions is controlled on the basis of control signals output from an operating unit (not shown) (for example, an operating unit of a controller connected to the lens device 14) operated by the operator, but a detailed description thereof is omitted.

The lens device 14 further includes an AF unit 26 and a lens CPU (not shown). The lens CPU controls the overall operation of the lens device 14. The AF unit 26 is a processing unit that acquires information required to perform AF control (auto focus), and includes an AF processing unit (not shown) and an imaging circuit for AF (not shown). The imaging circuit for AF is provided in the lens device 14 in order to acquire video signals for AF, and includes an imaging device (which is referred to as an imaging device for AF), such as a CCD, and a processing circuit that outputs a signal from the imaging device for AF as a video signal of a predetermined format. The video signal output from the imaging circuit for AF is a brightness signal.

Object light branched from the object light incident on the imaging device of the camera body 12 by, for example, a half mirror provided on the optical path of the imaging lens 24 is focused on the imaging surface of the imaging device for AF. The imaging range and the object distance (the distance to an object in focus) in the imaging area of the imaging device for AF are equal to the imaging range and the object distance in the imaging area of the imaging device of the camera body 12. The object image captured by the imaging device for AF is identical to that captured by the imaging device of the camera body 12. The two imaging ranges do not need to be completely equal to each other. For example, the imaging range of the imaging device for AF may include the imaging range of the imaging device of the camera body 12.

The AF processing unit acquires a video signal from the imaging circuit for AF, and calculates a focus evaluation value indicating the level of the contrast of the image of the object on the basis of the video signal. For example, high-frequency component signals are extracted from the video signals obtained by the imaging device for AF by a high pass filter, and among the high-frequency component signals, signals that correspond to one screen (one frame) and are in a range corresponding to an AF area to be subjected to AF processing are integrated. The integrated value corresponding to each screen indicates the level of the contrast of the image of the object, and is given as a focus evaluation value to the lens CPU.

The lens CPU acquires the information of the AF frame (AF frame information) indicating the range (outline) of the AF area from the image processing unit 18, which will be described below, and designates, as the AF area, the range of the AF frame designated by the AF frame information to the AF processing unit. Then, the lens CPU acquires the focus evaluation value calculated by the image (video signal) in the AF area from the AF processing unit.

In this way, whenever video signals corresponding to one screen are acquired from the imaging circuit for AF (whenever the AF processing unit calculates the focus evaluation value), the lens CPU acquires the focus evaluation value from the AF processing unit, and controls the focus lens group such that the acquired focus evaluation value is the maximum (the largest), that is, the contrast of the image of the object in the AF frame is the maximum. For example, generally, a hill-climbing method has been known as the method of controlling the focus lens group on the basis of the focus evaluation value. In the hill-climbing method, the focus lens group is moved in a direction in which the focus evaluation value increases, and when a point where the focus evaluation value starts to decrease is detected, the focus lens group is set to the point. In this way, the imaging device is automatically focused on the object in the AF frame.

The AF processing unit acquires the video signal from the imaging device for AF mounted to the lens device in order to calculate the focus evaluation value. However, the AF processing unit may acquire the video signal of the image captured by the imaging device of the camera body 12 from the camera body 12. In addition, any AF unit may be used for auto focusing on the object in the AF frame.

The camera body 12 and the lens device 14, and the lens device 14 and the image processing unit 18, which will be described below, are connected to each other by serial communication connectors provided therein directly or through cables. The camera body 12 and the lens device 14 are connected to each other by serial communication interfaces (SCI) 12a and 14a respectively provided therein such that various information items can be transmitted therebetween by serial communication. In addition, the lens device 14 and the image processing unit 18 are connected to each other by serial communication interfaces 14a and 30a respectively provided therein such that various information items can be transmitted therebetween by serial communication.

A video output connector of the camera body 12 and a video input connector of the image processing unit 18 are connected to each other by a cable with a down converter 28 interposed therebetween. In this way, the HDTV signal output from the video output connector of the camera body 12 is converted (down-converted) into a video signal (SDTV signal) of a standard television [NTSC (national television system committee)] format by the down converter 28, and the converted video signal is input to the image processing unit 18.

As described above, the image processing unit 18 designates the range (the position, size, and shape (aspect ratio)) of the AF frame when the AF unit 26 of the lens device 14 performs AF control. The image processing unit 18 transmits AF frame information designating the range of the AF frame in the image (imaging screen) captured by the television camera 10 to the lens device 14 using the serial communication. The AF unit 26 sets the range of the AF frame on the basis of the AF frame information transmitted from the image processing unit 18, and performs AF processing as described above.

The image processing unit 18 mainly includes a main board 30, a pattern matching board 32, and a face detecting board 34. The main board 30, the pattern matching board 32, and the face detecting board 34 respectively include CPUs 38, 50, and 52 such that the boards individually perform operating processes. In addition, the CPUs 38, 50, and 52 are connected to each other by a bus or a control line such that they perform data communication therebetween or the operating processes are synchronized with each other.

The main board 30 controls the overall operation of the image processing unit 18. The main board 30 includes an SCI 30a, a decoder (A/D converter) 36, a superimposer 42, and a RAM 40 in addition to the CPU 38 that performs an operating process.

As described above, the SCI 30a is an interface circuit for serial communication with the SCI 14a of the lens device 14, and transmits, for example, the AF frame information to the lens device 14.

The decoder 36 is a circuit for converting the video signal (SDTV signal) of the image captured by the television camera 10, which is input from the down converter 28 to the image processing unit 18, into digital data that can be processed by the image processing unit 18, and performs an A/D converting process of converting an analog SDTV signal into a digital video signal.

The RAM 40 is a memory that temporarily stores data used in the operating process of the CPU 38.

The pattern matching board 32 or the face detecting board 34 are arithmetic boards that individually perform a pattern matching process and a face detecting process, and include, for example, VRAMs 54 and 56 that temporarily store image data, in addition to the CPUs 50 and 52 that perform the operating processes.

The operating unit 20 is provided integrally with the image processing unit 18, or some or all of the operating members of the operating unit 20 are provided separately from the image processing unit 18 and connected to the image processing unit 18 by, for example, cables.

The operating unit 20 includes a position operating member 60 (for example, a joystick or a trackball) that is manually operated by the user to move the position of the AF frame in the horizontal and vertical directions, a size operating member 62 (for example, a knob) that is manually operated by the user to change the size of the AF frame, a shape operating member 64 (for example, a knob) that is manually operated by the user to change the shape of the AF frame, a tracking start switch 68 that instructs the start of auto-tracking, and a tracking stop switch 70 that instructs the stopping of the auto-tracking. A detailed description of the operating members will be omitted. The CPU 38 of the main board 30 of the image processing unit 18 reads the set states of the operating members 60, 62, 64, 68, and 70.

The user touches an LCD 66 with a touch panel to set the mode related to AF frame auto-tracking. The image displayed on the LCD 66 with a touch panel is appropriately changed by the CPU 38 of the image processing unit 18 depending on the set conditions.

The image displayed on the LCD 66 with a touch panel is transmitted from the superimposer 42 of the main board 30. The superimposer 42 composes the video signal of the image captured by the television camera 10, which is transmitted from the decoder 36, and the image signal generated by the CPU 38. In this way, it is possible to simultaneously display a superimposed image of the image captured by the television camera 10 and the image currently set in the AF frame on the viewfinder 13 set in the camera body 12 and the LCD 66 with a touch panel. The user can touch the screen to perform the same operations as that performed by the operating members 60, 62, 64, 68, and 70.

A process of setting the AF frame (AF frame setting process) performed by the lens device 14 under the control of the image processing unit 18 having the above-mentioned structure according to this embodiment will be described with reference to some embodiments.

Figure 2:
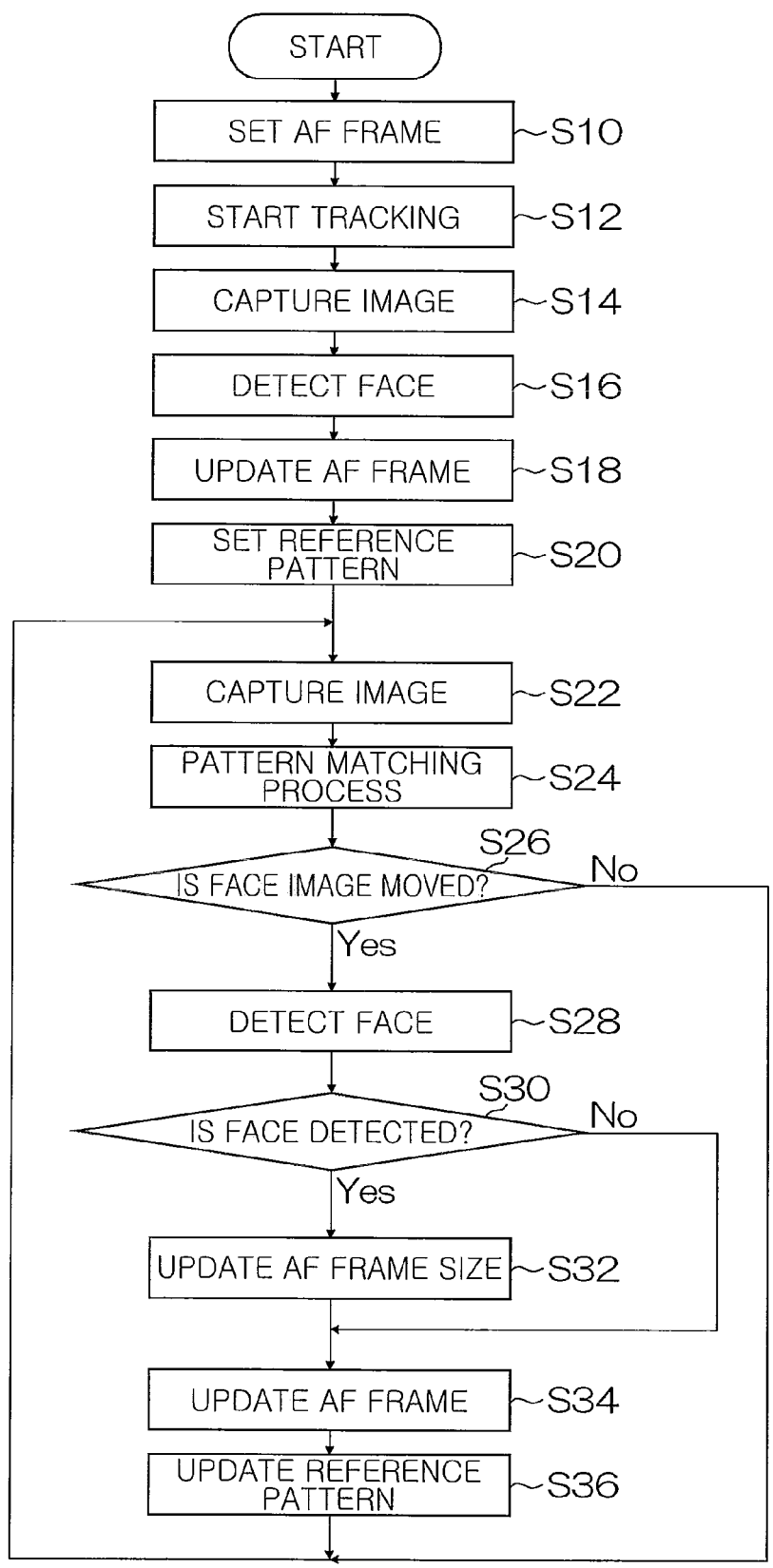
FIG. 2 is a flowchart illustrating the procedure of a first embodiment of an AF frame setting process.

A first embodiment of the AF frame setting process will be described with reference to the flowchart shown in FIG. 2. In this embodiment, when the face of a person is tracked as an AF target, the range of the AF frame is automatically changed so as to be matched with the face to be tracked. The range of the AF frame is determined by the position, size, and shape (aspect ratio) of the AF frame, and a change in the range of the AF frame means a change in at least one of the position, size, and shape of the AF frame.

Figure 3A:
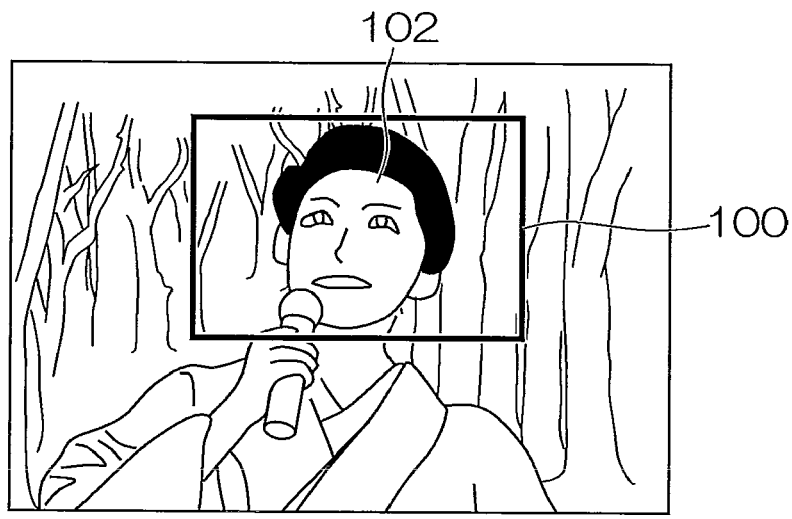
FIGS. 3A to 3C are diagrams illustrating the first embodiment of the AF frame setting process.

First, the user operates the operating unit 20 to designate the AF frame at the beginning such that an object to be tracked as an AF target is included in the AF frame. In this case, as shown in FIG. 3A, the user designates an AF frame 100 so as to include a face image 102 of a predetermined person, which is an object to be tracked, and sets the AF frame such that only the face of one person is included in the AF frame. It is not assumed that the AF frame is designated so as to include the faces of a plurality of persons. However, when a portion of the face is included in the AF frame, the face is regarded to be included in the AF frame.

The CPU 38 of the main board 30 sets the AF frame to be transmitted to the lens device 14 on the basis of the operation of the user (Step S10). Then, the CPU 38 starts an AF frame auto-tracking process (Step S12). For example, the auto-tracking process starts when a tracking start switch 68 of the operating unit 20 is turned on.

When the auto-tracking process starts, the CPU 38 inputs one frame of image data of the captured image in the digital image signals of the captured image output from the decoder 36 to the face detecting board 34 (Step S14).

Then, the CPU 52 of the face detecting board 34 performs a face detecting process of detecting the image of a face (face image) from the captured image and detects the face image included in the AF frame (Step S16).

Figure 3B:
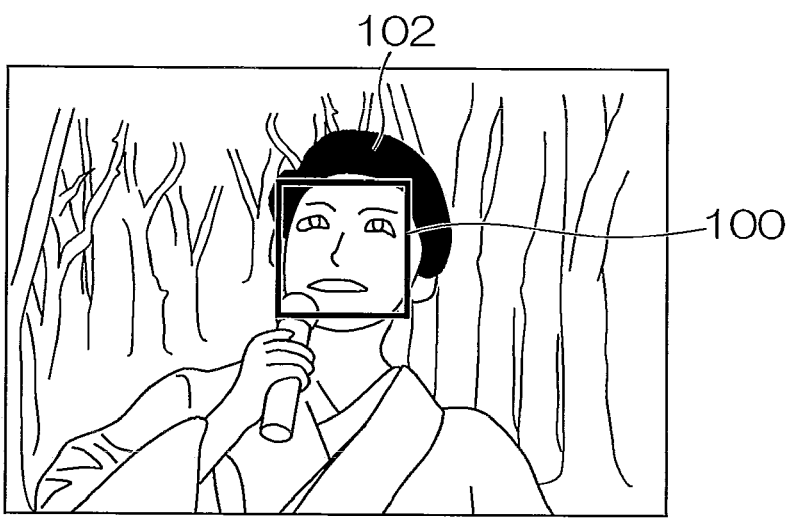

Then, the position, size, and shape of the AF frame that includes the entire face but does not include any other objects (that is, a minimum AF frame including the entire face) are calculated on the basis of the position, size, and shape of the face image included in the AF frame, and the AF frame to be transmitted to the lens device 14 is updated to the calculated AF frame (Step S18). When the user designates the AF frame as shown in FIG. 3A, the AF frame is updated to the AF frame 100 having a size suitable for the size of the face image 102 by the updating process in Step S18, as shown in FIG. 3B.

When the face image is matched in this way to update the AF frame, the image data in the AF frame is set as image data of a reference pattern in a pattern matching process, which will be described below (Step S20). The image data of the reference pattern does not need to be completely equal to the size of the AF frame, but the image data may be larger or smaller than the AF frame.

When the above-mentioned process ends, the following process from Steps S22 to S36 is repeatedly performed to track the face image in the AF frame and update the size of the AF frame according to the size of the tracked face image. In the following description, the size of the AF frame includes the shape of the AF frame. The aspect ratio of the AF frame may be updated to correspond to the face image, or the aspect ratio of the AF frame may be constant.

First, in Step S22, the CPU 38 inputs one frame of image data of the captured image from the decoder 36 to the pattern matching board 32 and the face detecting board 34.

Then, the CPU 50 of the pattern matching board 32 performs a pattern matching process of detecting the image matched with the reference pattern from the captured image and the position thereof (Step S24).

The CPU 38 determines whether the image matched with the reference pattern, that is, a face image to be tracked is moved into the captured image on the basis of the result of the pattern matching process in Step S24 (Step S26). The determination of the movement of the face image includes the enlargement and reduction of the face image by zooming or the movement of an object in a forward or backward direction.

If the determination result of Step S26 is 'NO', the process returns to Step S22.

On the other hand, if the determination result of Step S26 is 'YES', the CPU 52 of the face detecting board 34 performs a face detecting process of detecting a face image from the captured image (Step S28), and determines whether the face image is detected from the peripheral range of the AF frame (Step S30).

Figure 3C:
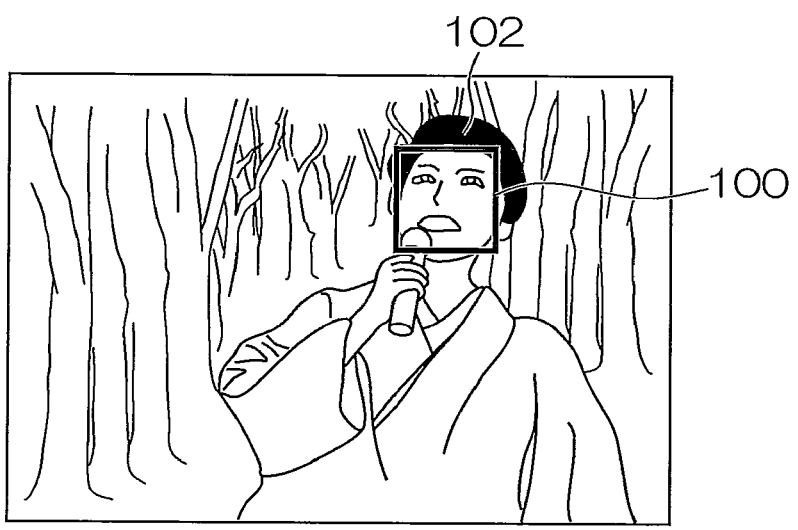

If the determination result of Step S30 is 'YES', the size of the AF frame is changed (updated) to a size suitable for the detected face image, that is, a minimum size including the entire face (Step S32), and the position of the AF frame is changed (updated) to the position of the detected face image (Step S34). In this way, for example, when the captured image is changed from FIG. 3B to FIG. 3C and the position and size of the face image to be tracked are changed, the position and size of the AF frame 100 are changed so as to be suitable for the position and size of the face image 102, as shown in FIG. 3C.

If the determination result of Step S30 is 'NO', the size of the AF frame is not changed, but the position of the AF frame is changed (updated) to the position of the image of the reference pattern detected in the pattern matching process of Step S24 (Step S34). If the determination result of Step S30 is 'YES', in Step S34, the position of the AF frame may be changed to the position of the image of the reference pattern detected in the pattern matching process.

When the AF frame is completely updated in Step S34, the image in the AF frame is updated to the image of the reference pattern (Step S36), and the process returns to Step S22.

In the above-mentioned flowchart, the pattern matching process (Step S24) and the face detecting process (Step S28) can be performed in this order, and a plurality of arithmetic units shown in FIG. 1 do not need to individually perform these processes. However, the main board 30 may perform the two processes, or an arithmetic board only for image processing other than the main board 30 may be provided and perform the two processes. Alternatively, each of the main board 30 and the arithmetic board may perform one process.

The range of the AF frame changed depending on, for example, the size of the face image is not necessarily limited to the minimum range which includes the entire face image. The range of the AF frame may be a range in which the face image is appropriately in focus by AF performed on the object in the AF frame, that is, a range suitable for the position and size of the face image.

According to the first embodiment of the AF frame setting process, if a person's face is included in the AF frame when the pattern matching process is performed to automatically track the object in the AF frame, the range of the AF frame is changed so as to correspond to the position and size of the face. Therefore, even when the user wants to set the person's face as a tracking target, the time and effort to accurately set the AF frame at the beginning such that the AF frame does not include a background image as small as possible are not required. In addition, even when a zoom operation is performed to change the size of the face image to be tracked, the range of the AF frame is changed so as to correspond to the face image. Therefore, it is possible to reduce the problems that AF or auto-tracking is not appropriately performed due to the background image in the AF frame.

Next, a second embodiment of the AF frame setting process will be described with reference to the flowcharts shown in FIGS. 4A to 4C. In this embodiment, in the process shown in the first embodiment, the pattern matching board 32 and the face detecting board 34 perform the pattern matching process and the face detecting process at the same time, thereby increasing the speed of a tracking process.

FIGS. 4A, 4B, and 4C are flowcharts illustrating the procedures of the processes performed by the CPU 38 of the main board 30, the CPU 50 of the pattern matching board 32, and the CPU 52 of the face detecting board 34, respectively. In addition, the same process as that in the flowchart according to the first embodiment shown in FIG. 2 is denoted by the same reference numeral as that in the flowchart shown in FIG. 2, and a detailed description thereof will be omitted.

First, similar to the first embodiment, the user operates the operating unit 20 to designate the AF frame at the beginning such that an object tracked as an AF target is included in the AF frame. The CPU 38 of the main board 30 sets the AF frame to be transmitted to the lens device 14 on the basis of the designation (Step S10 in FIG. 4A). Then, the CPU 38 starts an AF frame auto-tracking process (Step S12 in FIG. 4A).

When the auto-tracking process starts, the CPU 38 sets the position, size, and shape of the reference pattern in a pattern matching process on the basis of the position, size, and shape of the AF frame (Step S50 in FIG. 4A). Hereinafter, data for specifying the position, size, and shape of the reference pattern is referred to as the reference pattern coordinates.

Then, the CPU 38 transmits the reference pattern coordinates to the CPU 50 of the pattern matching board 32 (Step S52 in FIG. 4A).

When receiving the reference pattern coordinates from the CPU 38 of the main board 30 (Step S70 in FIG. 4B), the CPU 50 of the pattern matching board 32 repeatedly performs the following Steps S72 to S82 (Steps S72, S24, S26, S80, and S82). In the first process, the CPU 50 performs Step S72 and Step S80 to set image data of the reference pattern of the captured image on the basis of the reference pattern coordinates received in Step S70.

After setting the image data of the reference pattern, the CPU 50 inputs one frame of image data of the captured image in the digital image signals of the captured image output from the decoder 36 to the pattern matching board 32 (Step S72). Then, the CPU 50 performs a pattern matching process of detecting an image matched with the reference pattern from the captured image and the position thereof (Step S24 in FIG. 4B).

Then, the CPU 50 determines whether the image of the reference pattern, that is, a face image to be tracked is moved into the captured image on the basis of the result of the pattern matching process in Step S24 (Step S26 in FIG. 4B).

If the determination result of Step S26 is 'NO', the process returns to Step S24.

On the other hand, if the determination result of Step S26 is 'YES', the CPU 50 updates the detected image of the reference pattern to a new image of the reference pattern (Step S80 in FIG. 4B), and transmits the reference pattern coordinates to the CPU 38 of the main board 30 (Step S82 in FIG. 4B). Then, the process returns to Step S72.

The CPU 50 of the pattern matching board 32 repeatedly performs Steps S72 to S82.

The CPU 52 of the face detecting board 34 starts a process, in synchronization with the start of the pattern matching process in the pattern matching board 32, in response to instructions (not shown) from the CPU 38 of the main board 30, and repeatedly performs Steps S90 to S94 (S90, S28, S92, and S94) in FIG. 4C.

That is, the CPU 52 of the face detecting board 34 inputs one frame of image data of the captured image in the digital image signals of the captured image output from the decoder 36 to the face detecting board 34 (Step S90 in FIG. 4C)

Then, the CPU 52 performs a face detecting process of detecting a face image from the captured image (Step S28 in FIG. 4C), and determines whether the face image is detected (Step S92 in FIG. 4C).

If the determination result of Step S92 is 'NO', the process returns to Step S90. If the determination result of Step S92 is 'YES', the CPU 52 transmits information indicating the position (coordinates) and size of the detected face image to the CPU 38 of the main board 30 (Step S94), and the process returns to Step S90.

The CPU 52 of the face detecting board 34 repeatedly performs Steps S90 to S94.

After Step S52 in FIG. 4A, the CPU 38 of the main board 30 repeatedly performs Steps S54 to S34 (S54, S56, S30, S32, and S34).

First, the CPU 38 receives the reference pattern coordinates transmitted from the pattern matching board 32 in Step S82 of FIG. 4B (Step S54 in FIG. 4A).

Then, the CPU 38 receives the information about the position and size of the face image transmitted from the face detecting board 34 in Step S94 of FIG. 4C (Step S56 in FIG. 4A).

Then, the CPU 38 determines whether there is a face image detected from around the current position of the AF frame (Step S30 in FIG. 4A).

If the determination result of Step S30 is 'NO', the CPU 38 changes (updates) the position of the AF frame on the basis of the reference pattern coordinates acquired in Step S54 (Step S34 in FIG. 4A).

On the other hand, if the determination result of Step S30 is 'YES', the CPU 38 changes (updates) the size of the AF frame so as to correspond to the face image detected from around the position of the AF frame (Step S32 in FIG. 4A), and changes (updates) the position of the AF frame to the position of the face image (Step S34 in FIG. 4A).

When Step S34 ends, the CPU 38 returns to Step S54, and repeatedly performs Steps S54 to S34 (S54, S56, S30, S32, and S34).

As described above, the pattern matching board 32 and the face detecting board 34 respectively perform the pattern matching process and the face detecting process at the same time. Therefore, it is possible to reduce the problems that the tracking of the AF frame is delayed by the image processing requiring a long period of time.

Figure 5:
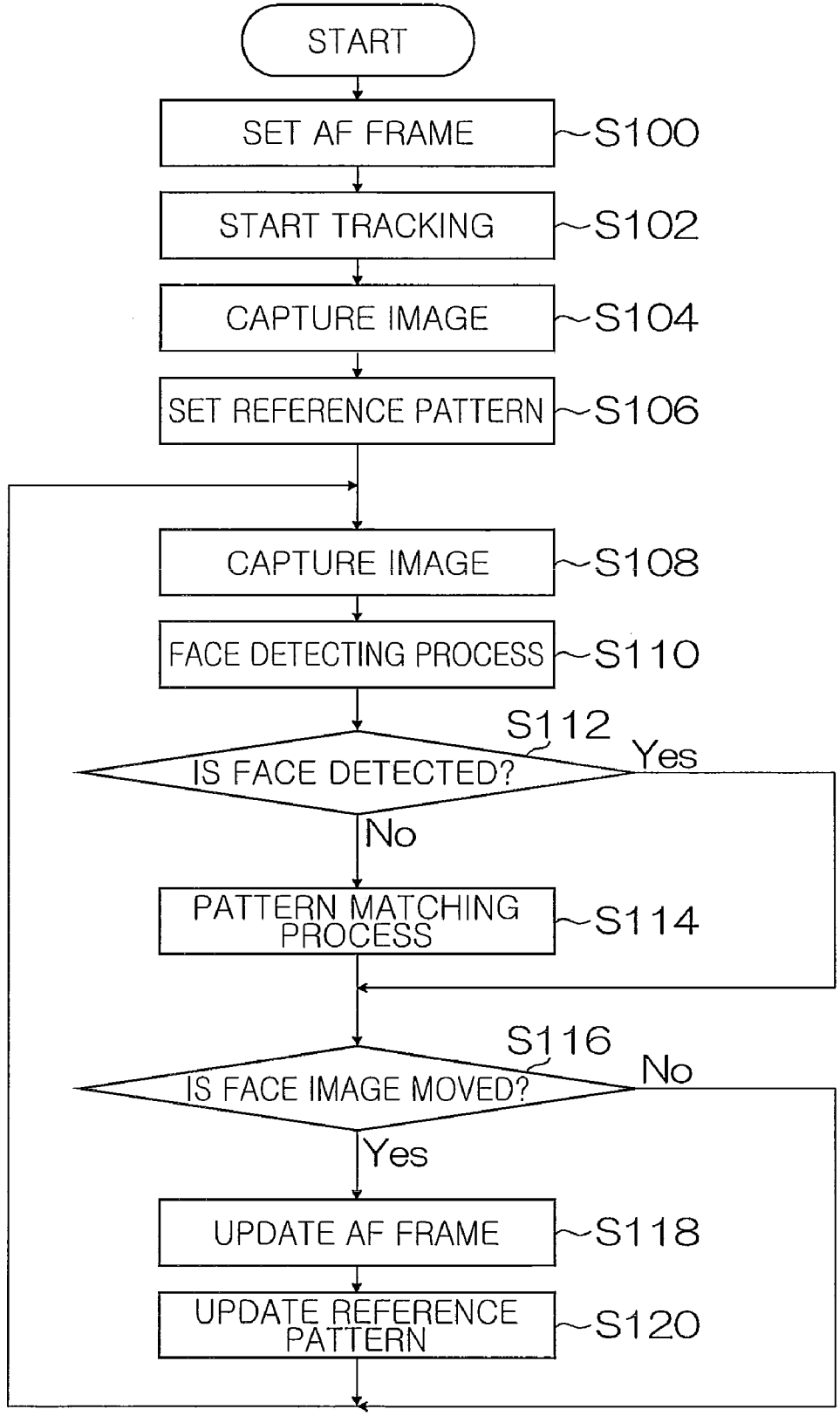
FIG. 5 is a flowchart illustrating the procedure of a third embodiment of the AF frame setting process.

Next, a third embodiment of the AF frame setting process will be described with reference to the flowchart shown in FIG. 5. In this embodiment, of the AF frame auto-tracking operation by the pattern matching process and the AF frame auto-tracking operation by the face detecting process, the AF frame auto-tracking operation by the face detecting process is preferentially performed, and when AF frame auto-tracking operation by the face detecting process is unavailable, the AF frame auto-tracking operation by the pattern matching process is performed.

First, the user operates the operating unit 20 to designate the AF frame at the beginning such that an object tracked as an AF target is included in the AF frame, similar to the first and second embodiments. The CPU 38 of the main board 30 sets the AF frame to be transmitted to the lens device 14 on the basis of the designation (Step S100). Then, the CPU 38 starts an AF frame auto-tracking process (Step S102).

When the auto-tracking process starts, the CPU 38 inputs one frame of image data of the captured image in the digital image signals of the captured image output from the decoder 36 to the pattern matching board 32 (Step S104).

Then, the CPU 38 sets the image data in the AF frame in the captured image as image data of a reference pattern in the pattern matching process (Step S106). The image data of the reference pattern does not need to be completely equal to the size of the AF frame, but the image data may be larger or smaller than the AF frame.

When the above-mentioned process ends, the following Steps S108 to S120 are repeatedly performed to track the face image in the AF frame.

First, in Step S108, the CPU 38 inputs one frame of image data of the captured image transmitted from the decoder 36 to the pattern matching board 32 and the face detecting board 34.

Then, the CPU 52 of the face detecting board 34 performs a face detecting process of detecting a face image from the captured image (Step S110), and determines whether the face image is detected from the AF frame (or the peripheral range of the AF frame) (Step S112).

If the determination result of Step S112 is 'YES', the CPU 52 determines whether the position of the face image detected in Step S110 is moved into the captured image (Step S116). If the determination result of Step S116 is 'NO', the CPU 52 returns to Step S108. If the determination result of Step S116 is 'YES', the CPU 52 changes (updates) the position of the AF frame to the position of the detected face image (Step S118). In addition, the CPU 52 updates the image in the AF frame to the image of the reference pattern (Step S120), and returns to Step S108. However, similar to the first and second embodiments, the CPU 52 may change (update) the size of the AF frame to a size suitable for the detected face image.

On the other hand, if the determination result of Step S112 is 'NO', the CPU 50 of the pattern matching board 32 performs a pattern matching process of detecting an image matched with the reference pattern from the captured image and the position thereof (Step S114).

Then, the CPU 38 determines whether the image of the reference pattern is moved into the captured image on the basis of the result of the pattern matching process in Step S114 (Step S116).

If the determination result of Step S116 is 'NO', the CPU 38 returns to Step S108.

On the other hand, if the determination result of Step S116 is 'YES', the CPU 38 changes (updates) the position of the AF frame to the position of the image of the reference pattern detected by the pattern matching process (Step S118). In addition, the CPU 38 updates the image in the AF frame as the image of the reference pattern (Step S120), and returns to Step S108.

In the above-mentioned flowchart, the pattern matching process (Step S114) and the face detecting process (Step S110) can be performed in this order, and a plurality of arithmetic units shown in FIG. 1 do not need to individually perform these processes. However, the main board 30 may perform the two processes, or an arithmetic board only for image processing other than the main board 30 may be provided and perform the two processes. Alternatively, each of the main board 30 and the arithmetic board may perform one process.

As in the second embodiment, the pattern matching board 32 and the face detecting board 34 may respectively perform the pattern matching process and the face detecting process at the same time, and the CPU 38 of the main board 30 may acquire the processed results, if necessary.

In this embodiment, when the face detecting process is performed to detect the face image, the AF frame auto-tracking operation by the face detecting process is preferentially performed. However, when the pattern matching process is performed to detect the reference pattern, the AF frame auto-tracking operation by the pattern matching process may be preferentially performed, and when the pattern matching process is unavailable, the AF frame auto-tracking operation by the face detecting process may be performed.

According to the third embodiment of the AF frame setting process, for example, even when the face of a person to be tracked is turned in a direction other than the front side (camera side) in the plane and face detection is unavailable, the AF frame auto-tracking operation by the pattern matching process is performed. Therefore, the reliability of the auto-tracking operation is improved.

In the third embodiment, similar to the second embodiment, the pattern matching board 32 and the face detecting board 34 may respectively perform the pattern matching process and the face detecting process at the same time. In this case, it is possible to reduce the process time.

What is claimed is:

1. An auto focus system having an AF frame auto-tracking function, comprising:
   an auto focus unit that controls the focus of an imaging optical system which focuses an imaging unit on an object such that an object in a portion corresponding to an AF frame in the range of the object captured by the imaging unit is in focus;
   a reference pattern image storage unit that stores the image of an object, which is a tracking target to be focused, as a reference pattern image;
   a pattern matching unit that detects the image of the object, which is the tracking target, from the image captured by the imaging unit, using a pattern matching process, on the basis of the reference pattern image;
   an AF frame changing unit that changes the position of the AF frame on the basis of the position of the image of the object, which is the tracking target, sequentially detected by the pattern matching unit from the image sequentially captured by the imaging unit such that the auto focus unit performs auto focus on the object, which is the tracking target; and
   a face detecting unit that detects the image of a person's face from the image captured by the imaging unit,
   wherein, when the image of the face detected by the face detecting unit is included in the range of the AF frame, the AF frame changing unit changes the range of the AF frame so as to correspond to the position and size of the image of the face.

2. The auto focus system having an AF frame auto-tracking function according to claim 1,
   wherein the AF frame changing unit changes the position and size of the AF frame so as to correspond to the position and size of the image of the face.

3. The auto focus system having an AF frame auto-tracking function according to claim 1,
   wherein the reference pattern image stored in the reference pattern image storage unit is sequentially updated with an image in a range corresponding to the AF frame.

* * * * *